Aug. 4, 1964  J. P. MAHONEY, JR., ET AL  3,143,388
RECORDING APPARATUS
Filed Feb. 7, 1957  7 Sheets-Sheet 1

INVENTORS.
JOHN P. MAHONEY JR.
BY  RICHARD S. KAMPF
*Arthur H. Swanson*
ATTORNEY.

Aug. 4, 1964    J. P. MAHONEY, JR., ETAL    3,143,388
RECORDING APPARATUS
Filed Feb. 7, 1957
7 Sheets-Sheet 2

FIG. 3

INVENTORS.
JOHN P. MAHONEY JR.
RICHARD S. KAMPF
BY
Arthur H. Swanson
ATTORNEY.

Aug. 4, 1964

J. P. MAHONEY, JR., ETAL

3,143,388

RECORDING APPARATUS

Filed Feb. 7, 1957

INVENTORS.
JOHN P. MAHONEY JR.
RICHARD S. KAMPF
BY

*Arthur H. Swanson*

ATTORNEY.

Aug. 4, 1964  J. P. MAHONEY, JR., ETAL  3,143,388
RECORDING APPARATUS
Filed Feb. 7, 1957

INVENTORS.
JOHN P. MAHONEY JR.
BY    RICHARD S. KAMPF

ATTORNEY.

Aug. 4, 1964   J. P. MAHONEY, JR., ET AL   3,143,388
RECORDING APPARATUS
Filed Feb. 7, 1957   7 Sheets-Sheet 5

INVENTORS.
JOHN P. MAHONEY JR.
RICHARD S. KAMPF
BY Arthur H. Swenson
ATTORNEY.

Aug. 4, 1964  J. P. MAHONEY, JR., ETAL  3,143,388
RECORDING APPARATUS

Filed Feb. 7, 1957  7 Sheets-Sheet 6

INVENTORS.
JOHN P. MAHONEY JR.
RICHARD S. KAMPF
BY
ATTORNEY.

United States Patent Office 3,143,388
Patented Aug. 4, 1964

3,143,388
RECORDING APPARATUS
John P. Mahoney, Jr., Wheatridge, and Richard S. Kampf, Denver, Colo., assignors to Minneapolis-Honeywell Regulator Company, Minneapolis, Minn., a corporation of Delaware
Filed Feb. 7, 1957, Ser. No. 638,729
7 Claims. (Cl. 346—109)

A general object of this invention is to provide improvements in recorders in which electrical, optical, and mechanical components are cooperatively associated to reveal an immediately visible and permanent trace or image having a high degree of resolution and contrast. This trace provides a record of physical, mechanical, electrical, chemical, or other phenomena which fluctuate rapidly with lapse of time.

In a preferred embodiment of the invention, a beam of radiant energy having a spectral composition comprising wave-lengths adjacent those of and including visible light is reflected by a mirror. The mirror, in turn, is attached to and moves with the deflecting element of a galvanometer in response to the current fluctuations in an electric circuit, which fluctuations are representative of changes in the phenomena under observation. The reflected beam of radiant energy is directed to the surface of a travelling, sensitized, recording medium or film to produce a sharply defined, permanent, and immediately visible trace or image having a higher degree of resolution and contrast than has heretofore been possible.

A specific object of the invention is to provide a recorder of the type described which is operative to produce such immediately visible and permanent traces or images of high resolution and contrast at writing speeds far in excess of those heretofore permissible. To this end, the recording medium or film employed preferably is conditioned according to the process disclosed in copending application of R. A. LeMassena and R. S. Kampf, Serial No. 631,078; filed December 28, 1956, now Patent No. 3,035,912. (Case 1959H.)

It is yet another object of this invention to produce a trace on a suitable recording medium or film by the use of radiant energy having a range of wavelengths adjacent to those of visible light. More specifically, it is an object of this invention to produce a trace by the use of radiant energy including wavelengths in the range from 200 to 600 millimicrons.

It is a further object of this invention to provide an improved recording apparatus which may be employed to produce immediately visible and permanent traces or images representative of fluctuations in the value of physical, electrical, mechanical, or chemical phenomenon over the wide frequency range, regardless of whether or not the variations in frequency are recurrent.

Another object of this invention is to provide recording mechanism comprising, a source of radiant energy, a system of lenses and mirrors which collect the radiant energy into a beam, means whereby the time-variations of the phenomena under observation may effect movement of the lenses and mirrors and cause the beam of radiant energy to traverse along an axis, and a film or recording medium which has been sensitized to the radiant energy of the beam by being exposed to low-intensity radiant energy and which is moved continuously with time along an axis at an angle to the axis traversed by the beam, on which film or recording medium the beam of radiant energy impinges and causes a trace to become visible immediately.

To that end, a novel optical arrangement is provided to collect a maximum of the radiant energy emitted by a source of radiant energy and to produce a high concentration of radiant energy in a small spot on the surface of a recording medium or film. This optical arrangement permits a galvanometer mirror of small size to be used so that the mass and inertia thereof are a minimum, thus producing a higher frequency response and permitting writing speeds higher than heretofore possible.

Specifically, in a preferred embodiment of the invention, a collector cylindrical lens is located about one-half inch from a so-called Osram lamp, as close as possible consistent with the size and shape of the lamp itself and reasonable lens design, to collect as much radiant energy as possible and to direct it by way of the galvanometer mirror and associated lenses and mirrors to the recording paper. By this arrangement it has been possible to get a high percentage of the energy emitted by the lamp arc to the paper. The improvement over conventional optical arrangements is estimated to be at least of the order of 10 to 1. Additionally, by this arrangement, it has been possible to keep the galvanometer mirror small in size, thus keeping the galvanometer mass and inertia as small as possible. This has contributed to the high frequency response of the galvanometer and has permitted higher writing speeds than would otherwise be possible.

The accomplishment of the objects of the present invention accordingly are obtained by directing as high an intensity of radiant energy to the paper, as possible consistent with maintaining the lowest mass and inertia possible of the galvanometer, and utilizing a recording (photographic) paper that will respond at high speeds to the highly intense radiant energy beam.

A better understanding of the present invention may be had from the following detailed description when read in connection with the accompanying drawings in which.

General Description

This recorder comprises a case in which the various parts are housed and which has a slot or opening through the wall thereof, a housing in which are mounted means for supporting a supply of recording medium or film which issues through the slot in the case, means for driving the film at various speeds, and an optical arrangement for making a record on the film, which record becomes visible immediately or substantially immediately depending upon the characteristics of the recording apparatus and of the recording medium employed, as hereinafter described.

Case

The case, generally indicated 1, comprises a substantially rectangular box made of sheet metal or like rigid material and having a base or lower portion 2 to which is hinged a top or cover 3. The base 2 and top 3 are secured together by piano hinges 4, best seen in FIGS. 3 and 4, and, when closed, are held by attachable and detachable clasps 5.

Figure 6:
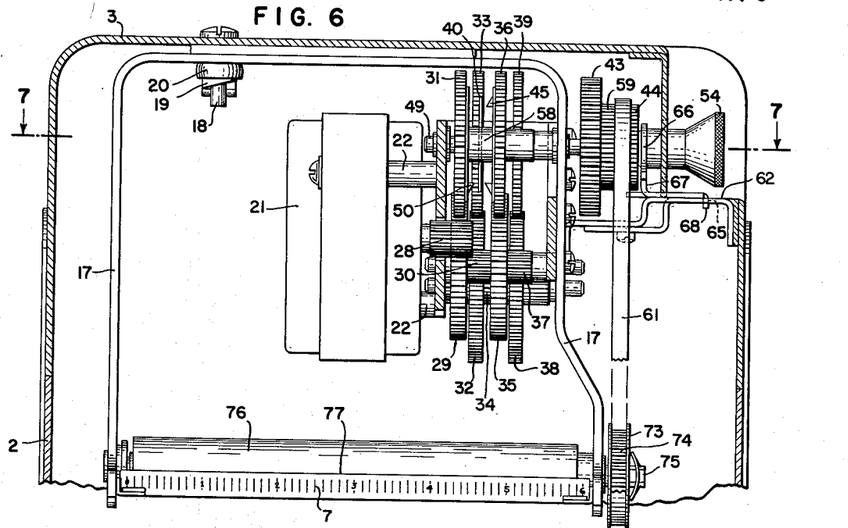
FIG. 6 is a vertical cross section on an enlarged scale taken on line 6—6 of FIG. 3 as viewed in the direction of the arrows.

The front of the case 1 has a slot or opening 6 through it. The film F issues from the case through slot 6. A portion of the front of the case above the slot 6 is a sheet 6A of transparent material such as "Plexiglas." Behind this transparent portion is mounted a calibration scale 7, best seen in FIGS. 6 and 9. Radiation from the galvanometer mirrors (hereinafter mentioned) impinges upon the surface of the recording medium or film in front of the scale 7. This radiation produces a brightly illuminated, high-intensity spot. Excursions of this spot with reference to scale 7 indicate the instantaneous values and changes in value of the variable or phenomenon which is being recorded on the film as a trace, and is utilized for calibration purposes.

Figure 1:
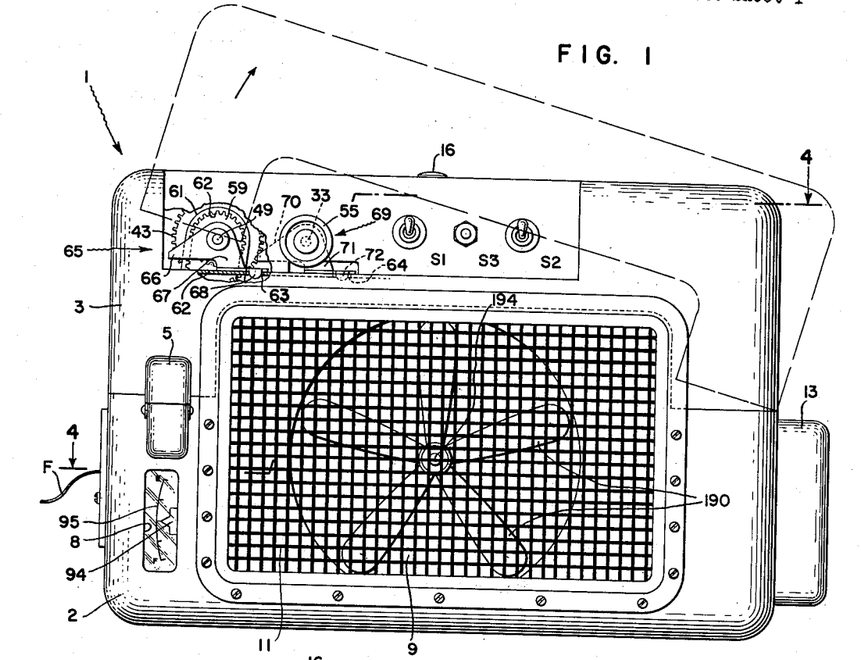
FIG. 1 is a side elevation.
Figure 2:
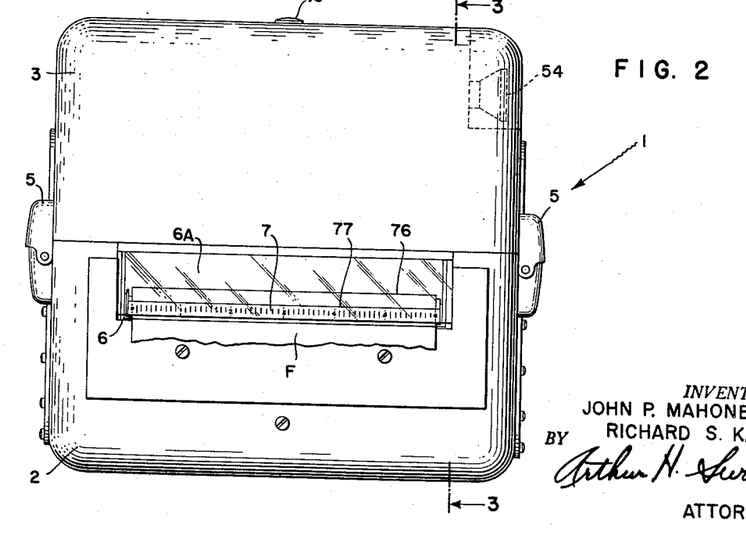
FIG. 2 is a front elevation.

FIG. 1 shows that the right hand side of the case, as viewed from the front, has an indicator opening 8 through it for a purpose to be set forth hereinafter. This right hand side also has a fan opening 9 through it which is closed by the screen 11. The left hand side of the case, as viewed from the front, has an air outlet opening 10 through it which is also closed by a screen 12, best seen in FIG. 3.

Figure 3:
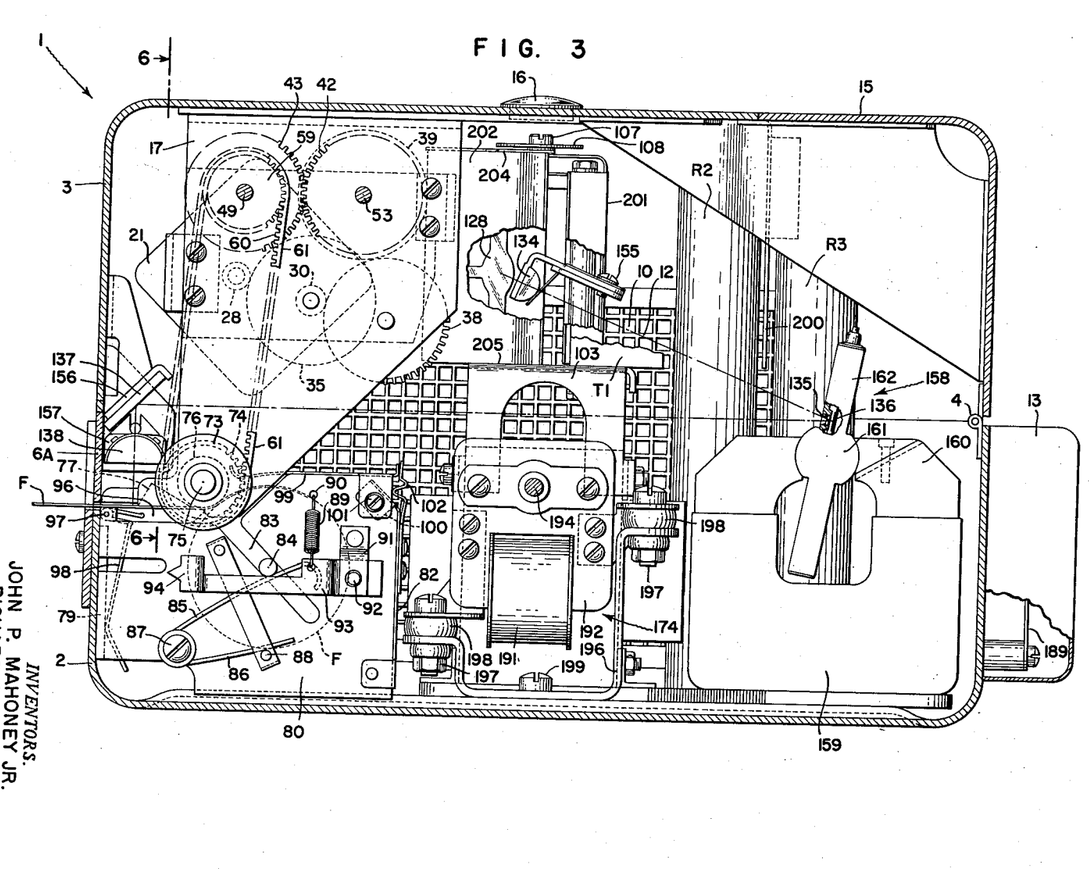
FIG. 3 is a vertical, longitudinal, cross section taken on the line 3—3 of FIG. 2 as viewed in the direction of the arrows.
Figure 15:
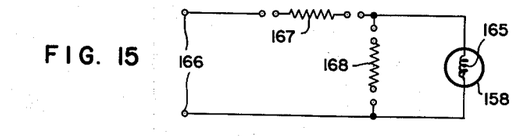

FIGS. 1 and 3 show that there is mounted on the back of case 1 a cover 13 which encloses a terminal block 189 of insulating material on which are mounted the circuit connections for the galvanometers hereinafter mentioned. These circuit connections are shown in FIG. 15 and each includes a series resistor 167 and a shunt resistor 168 for each galvanometer.

Adjacent the rear of top 2 is an access door 15 hinged to top 2 to permit adjustment of the galvanometers (hereinafter mentioned).

Through approximately the middle of top 2 passes an opening which is closed by a removable plug 16. Plug 16 is located above the source of radiant energy (hereinafter mentioned) so that access may be had to this source of radiant energy to adjust it vertically.

Means for Driving Recording Medium

FIGS. 3, 5, 6, and 7 show that the means for driving the recording medium F are composed of a substantially U-shaped frame 17 which is secured to the top 2 by means of three vibration isolation mounts of which but one is shown. This vibration isolation mount comprises a screw 18 having a nut 19 and a ring 20 of flexible material thereon.

An electric motor 21 is mounted on frame 17. Electric motor 21 is a commercially available, constant speed, shaded pole, rotating field motor adapted for connection to a commercially available source of 115 volt, 60 cycle A.C. Motor 21 is mounted in frame 17 by means of two pillars 22 of which but one appears in the drawing. Electric motor 21 drives belt sprocket 44 by means of a change speed gearing and clutch arrangement now to be described.

Figure 5:
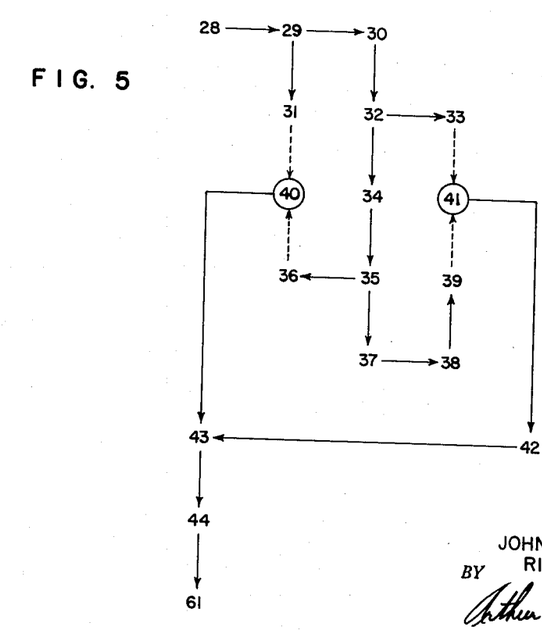
FIG. 5 is a diagram.

FIG. 5 is a diagram showing the way in which the elements of the change speed gearing and clutch arrangement operate by means of arrows which show the directions in which power is transmitted. Motor pinion 28 drives gear 29 which in turn drives clutch gear 31 and pinion 30. Pinion 30 drives gear 32 which drives both clutch gear 33 and pinion 34 on gear 32. Pinion 34 drives gear 35. Gear 35 drives both clutch gear 36 and pinion 37, which in turn, drives gear 38. Gear 38 drives clutch gear 39.

Clutch pin 40 (FIG. 6) is manually adjustable by means of handle 54 to one of the three following positions: neutral position, position to be engaged by clutch ratchets 45 on clutch gear 36, or position to be engaged by clutch ratchets 50 on clutch gear 31. Similarly, clutch pin 41 (FIG. 7) is manually adjustable by handle 55 into one one of the three following positions: neutral position, position to be engaged by clutch ratchets 51 on clutch gear 33, or position to be engaged by clutch ratchets 52 on clutch gear 39. Clutch pin 40 is guided in its movement along the axis of shaft 49. Clutch pin 40 is fast on shaft 49 as is belt sprocket 44. C-shaped retainers 58 are used to space gears 31 and 36. C-shaped retainers 48 space gears 33 and 39. Pins 40 and 41 move between C-shaped retainers 58 and 48. Retainers 58 and 48 also center and hold clutch plates against gears. Clutch pin 41 is guided in its movement along the axis of shaft 53. Pin 41 is fast on shaft 53 as is gear 42. Gear 42 meshes with gear 43 which is fast on shaft 49 so that, when pin 41 is in position to be driven by clutch gear 33, gears 42 and 43 turn belt sprocket 44. When clutch pin 41 is in position to be driven by clutch gear 39, gears 42 and 43 drive belt sprocket 44. When clutch pin 40 is in position to be driven by either clutch gear 31 or clutch gear 36, the drive to belt sprocket 44 is directly through shaft 49. Belt sprocket 44 has cleats 59 on its outer surface of suitable size to mesh with like cleats 60 on belt 61.

Figure 7:
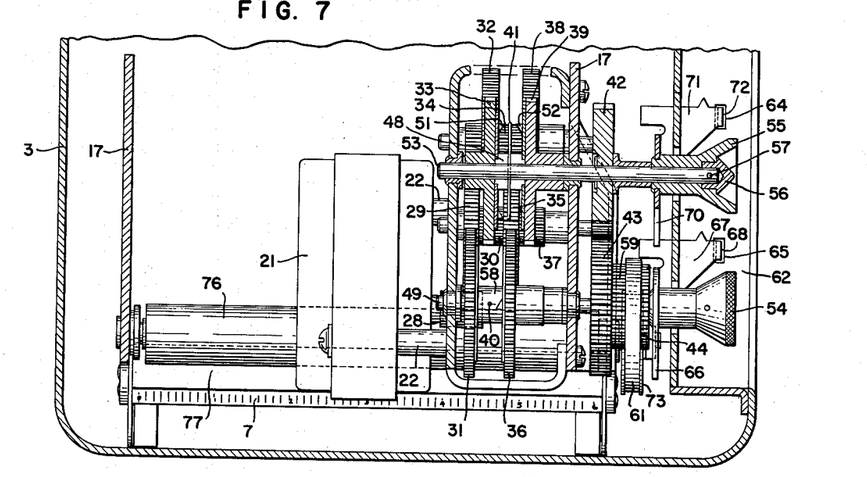
FIG. 7 is a horizontal cross section on the same scale as FIG. 6 taken on line 7—7 of FIG. 6 as viewed in the direction of the arrows.
Figure 8:
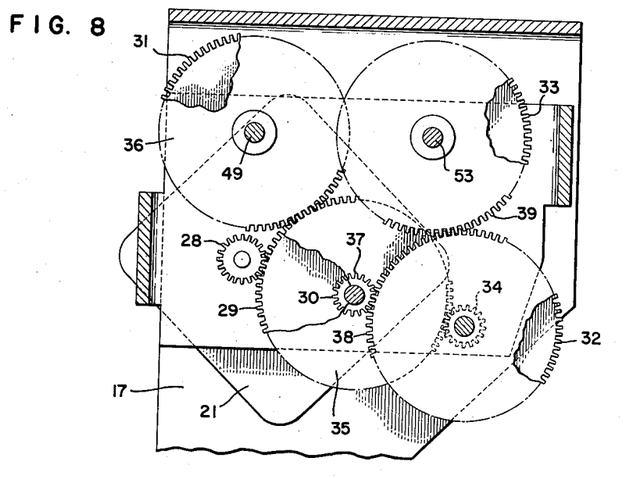
FIG. 8 is a vertical view of a portion of the recorder with parts in vertical cross section.

Shafts 49 and 53 are free to rotate in handles 54 and 55, respectively. FIG. 7 shows that this is accomplished by means of a cap 56 which is secured to shaft 53 by a pin 57 so that cap 56 rotates with shaft 53 and leaves handle 55 free from rotation.

An interlock is provided between handles 54 and 55 so that clutch pin 40 can be engaged with clutch gear 31 or with clutch gear 36 or clutch pin 41 can be engaged with clutch gear 33 or with clutch gear 39 but only one of these pins can be engaged with one of these gears at one time. This interlock includes elements 66, 67, and 68 which comprise a plate 65 secured to handle 54 so as to rotate or translate therewith. Plate 65 has an arm 66 and a second arm 67 having a key 68 thereon. Key 68 is normally located in hole 63 in stationary plate 62. A similar plate 69 is secured to handle 55 so as to be carried thereby either during rotation or translation of handle 55. Plate 69 has an arm 70 and a second arm 71 having a key 72 on it. A key 72 normally occupies hole 64 in stationary face 62. When keys are in holes pins are half-way between gears. This represents the neutral position.

FIG. 1 shows that handle 54 may be rotated counter-clockwise only if key 72 on handle 55 is in hole 64. This allows key 68 to be lifted out of hole 63. Further rotation is prevented by arm 67 engaging underside of arm 70 on handle 55. When key 68 has been lifted out of hole 63, handle 54 can be moved longitudinally along its axis of rotation so as to engage clutch pin 40 either with clutch gear 31 or with clutch gear 36.

Similarly, counter-clockwise rotation of handle 55 is possible only if key 68 is in hole 63. Further rotation is prevented by arm 70 engaging top of arm 67. When key 72 is disengaged from hole 64, handle 55 can be moved lengthwise of its axis of rotation so as to engage clutch pin 40 either with clutch gear 31 or with clutch gear 36.

Figure 9:
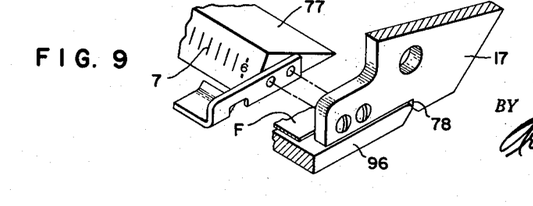
FIG. 9 is a perspective view of a portion of the recorder.

Belt 61 (FIG. 3) also meshes with a belt driven sprocket 73 having on its surface cleats 74 which mesh with the cleats 60 on belt 61. Driven sprocket 73 is fast on one end of a shaft 75 which is journaled or otherwise rotatably mounted in frame 17. Drive roll 76 is suitably located so that, when in normal position, it engages the film on the supply roll (to be hereinafter described) and drives the film off the supply roll. Immediately beneath the drive roll 76 is located a triangular piece 77 which is fastened to frame 17 and which has calibration scale 7 on its outer surface. Each of the side pieces of frame 17 has in its lower face, as is best seen in FIG. 9, a notch 78 for a purpose to be hereinafter described.

Recording Medium Supply

The recording medium or film F is stored in the recorder in the form of a roll. This roll is mounted in a film supply housing comprising a U-shaped member having a front wall 79, a right side wall 80, and a left side wall 81. Across the back of this U-shaped member is fastened a back wall 82. Side walls 80 and 81 each have a slot 83 therein located at 45° to the vertical. Slots 83 are adapted to receive in them ends of shaft 84 on which the roll of film F is mounted.

Shaft 84 and the roll of film or recording medium F thereon is mounted in the supply housing by means of a pair of coil springs each wrapped, intermediate its ends, around a stationary screw 87 and having a lower leg 86 bearing against a stop 88 and an upper leg 85 bearing against the underside of one end of shaft 84 and thereby supporting shaft 84 in the housing.

An indicator is provided to show the amount of film F remaining on the supply roll. This indicator comprises a lever 93 which bears at its upper surface against one end of shaft 84 being pulled into engagement with the end of shaft 84 by a coil spring 89 which is fastened at its opposite end to right side wall 80 by means of hole 90. Lever 93 is pivoted on a stationary piece 91 by a pivot 92 and carries, at its free or front end, a pointer 94 cooperating with a scale 95. Pointer 94 and scale 95 are visible from the exterior of the recorder through opening 8 in base 2 (FIG. 1).

Pivoted to the front of right side wall 80 and left side wall 81 is a guide plate 96 pivoted at 97. A pair of guide springs 98 bias guide plate 96 for movement in counter-clockwise direction.

A cover 99 is pivoted to the upper rear corner of side walls 80 and 81 by means of ears 100 and pivot pins 101. A spring 102 biases cover 99 for movement in a counter-clockwise direction. This counter-clockwise motion of cover 99 is stopped when cover 99 engages the tops of side walls 80 and 81, respectively.

Loading Supply of Film Into Housing

When it is desired to load a roll of film or recording medium F into the recorder, the top 2 is lifted (as shown in FIG. 1 in dotted line), the cover 99 is turned clockwise and manually against the bias of spring 100, and guide plate 96 is turned manually counter-clockwise about 100° from the position in which it is shown in FIG. 3 or until it has passed through vertical alignment with the front wall 79.

A roll of film or recording medium F mounted on a shaft 84 is then placed so that the ends of the shaft 84 occupy the slots 83 and engage the upper surfaces of the upper arms 85 of the U-shaped springs. When top cover is closed roller 76 engages recording paper roll and compresses springs 85 so that the ends of shaft 84 are located near the lower ends of the slots 83 and the pointer 94 is at the lower end of its arc of travel and opposite that marking of the scale 95 which indicates that the supply roll is full. The cover 99 is caused to follow the paper roll counter-clockwise until it reaches substantially a horizontal position, in which it is shown in FIG. 3, by means of spring 102. Guide plate 96 is rotated clockwise by contact with paper roll until spring 98 engages the inner face of the front wall 79. The top 3 is then lowered counter-clockwise, as seen in FIG. 1, until the notch 78 in the lower edge of frame 17 engages the top of guide plate 96 and causes the guide plate 96 to assume a horizontal position beneath the off-going layer of film or recording medium F. The guide plate 96 thus locks in the notch 78 and provides accurate location of the drive roller 76 with relation to the film or recording medium F. Guide plate 96 also prevents forward movement of the transmission assembly mounted on the frame 17. Guide plate 96, together with the triangular paper-hold-down bar 77 on which the scale 77 is marked, serve to guide the film or recording medium F as it passes out on the front of the recorder. This prevents rippling and other disturbance to the recording medium at the recording area in front of hold-down bar 77. The spacing between the lower or horizontal face of the triangular paper-hold-down bar 77 and the upper face of the guide plate 96 is of the order of 0.010 to 0.015 inch. Guide plate 96 also serves the purpose of a light shield to exclude external light from the supply roll of film or recording medium F.

Source of Radiant Energy

FIGS. 3, 4, 10, and 11 show that the source of radiant energy comprises a high-pressure, mercury-vapor lamp having a point-shaped arc. An example of such a lamp is that manufactured by Osram, Munich, West Germany, and identified as their model HBO-107/1, super pressure mercury lamp. The lamp 128 comprises a quartz envelope 130 containing an inert gas and a certain quantity of mercury. The anode consists of tungsten and is connected to the lower contact 129. The cathode is smaller and is connected to the upper contact 132. An ignition or starting electrode 131 projects from the side of the envelope.

Such a lamp produces such a point-shaped arc (0.3 by 0.3 millimeters square) the brightness of which is about 100,000 stilb or candles per square centimeter. "Stilb" refers to a fundamental unit in photometry and is derived from the Greek "stilbein" meaning to glare. A stilb of light intensity equals one candle per square centimeter. It is also defined as one-sixtieth of the brightness of a black body at the temperature of melting platinum. A high percentage of this radiation is ultra violet. The lamp is heated to a high temperature during service. The high pressure within the lamp causes great mechanical stress during service. In order to compensate for the resulting expansion and to allow vertical adjustment, the lamp is mounted on a spring support comprising spring terminals 127 and 134 which engage contacts 129 and 132 respectively.

Means are provided for conducting electricity through lamp 128 and for adjusting lamp 128 vertically. These means comprise a stationary bracket 103 which supports a U-shaped bracket 104 having inturned upper ends between which is mounted a cross piece 105 having a screw threaded hole passing vertically therethrough. Passing through this hole is a vertical screw 106 which mates with a thread in the hole and which has a slotted head 107 at the upper end thereof. Head 107 is located directly beneath the hole in the top 3 and is accessible through this hole when the plug 16 is removed.

Head 107 of screw 106 carries a disc-shaped washer 108 which is used to baffle light coming through hole directly underneath the disc. The lower face of screw head 107 bears on the upper face of spring terminal 134B.

The arms of spring terminal 134B are held in a pair of posts which are substantial duplicates so that a description of but one will be given in detail. The other post is made of substantially identical elements. The same reference characters as those of the right hand post (but having the letter A appended thereto to distinguish them) are applied to the left hand post.

The right hand post comprises a rod 111 having a head 120 at its lower end and screw threads adjacent its upper end to which is secured nut 112. The lower face of nut 112 bears on the upper face of an insulating ring 113 having two diameters. The lower face of the larger diameter of ring 113 bears on the upper arm 110 of spring terminal 134B, the lower side of which bears on the upper face of tube 114 of insulating material. The lower arm 119 of spring terminal 134B bears on the upper end of a tube of insulating material 115. The lower face of the tube of insulating material 116 bears on the upper arm 126 of spring terminal 127. The lower face of the upper arm 126 of spring terminal 127 bears on the upper face of tube 117 of insulating material which bears, at its lower face, on the upper face of lower arm 124 of spring terminal 127. The lower face of the lower arm 124 of spring terminal 127 bears on the larger diameter of a conducting ring of two diameters 118. Ring 118 is of conducting material and has clamped against it by head 120, a conducting ring 121 which forms the end of a conductor having insulation 122.

Figures 10, 11, 12:
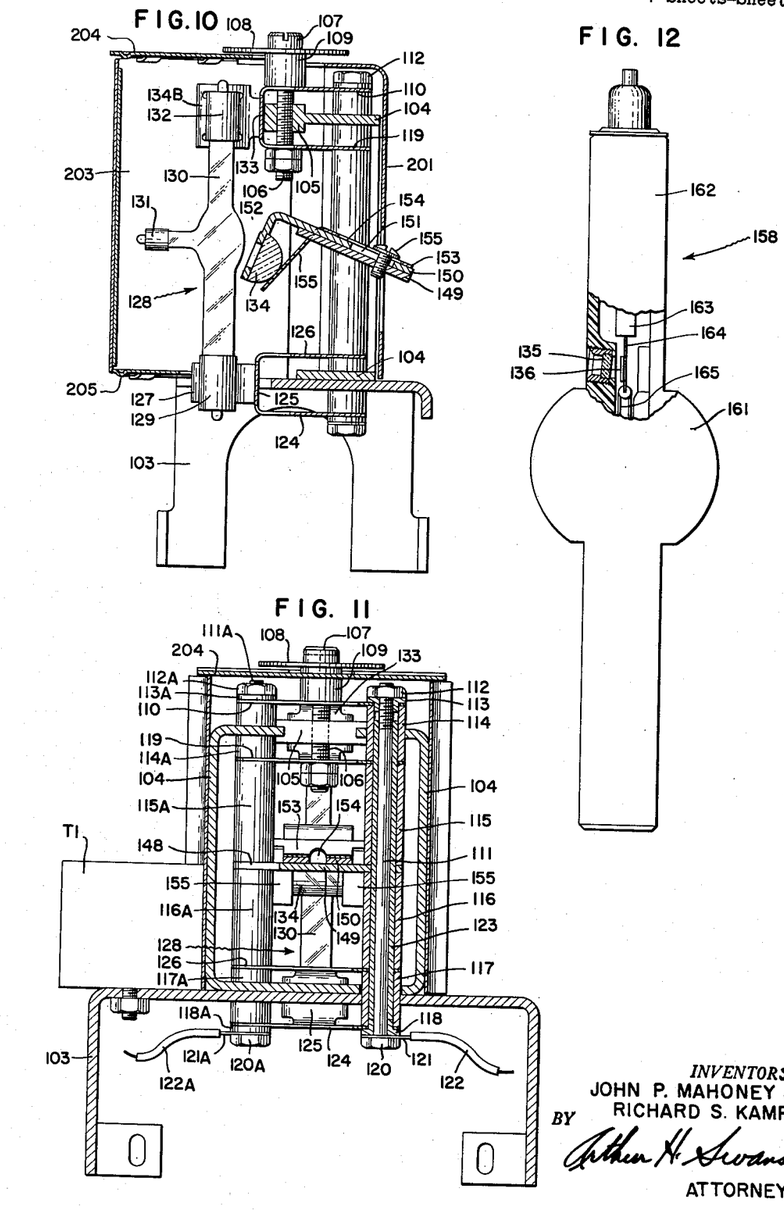
FIG. 10 is a vertical, longitudinal, cross section on an enlarged scale taken on line 10—10 of FIG. 4 as viewed in the direction of the arrows.
FIG. 11 is a vertical, transverse, cross section taken on line 11—11 of FIG. 4 as viewed in the direction of the arrows.
FIG. 12 is a side elevation on an enlarged scale with parts broken away to reveal the interior of the galvanometer.

FIG. 10 shows that spring terminal 134B comprises upper spring arm 110, lower spring arm 119, a vertical conductor 133 connecting arms 110 and 119 together, and a pair of tangs of the same flexible, conducting material extending to the left and which yieldingly engage the outer surface of cathode contact 132. Likewise, spring terminal 127 comprises upper spring arm 126, lower spring arm 124, a vertical conductor 125 connecting arms 126 and 124 together, and a pair of tangs of the same flexible, conducting material extending to the left and which yieldingly engage the outer surface of anode contact 129.

Electricity is conducted from ring contact 121 to ring 118, and lower arm 124 of spring terminal 127 to anode contact 129.

Left hand post 112A to 121A comprises substantially similar elements except that ring 113A is of conducting material and serves to conduct current from rod 111A to upper arm 110 of spring terminal 134B and to cathode contact 132.

Since the right hand post (composed of elements 112 to 120) and the left hand post (composed of element 112A to 121A), respectively, are connected to insulating cross piece 105 by screw 106 when screw 106 is rotated, the spring terminals 127 and 134B are flexed and the elements carried thereby, including the lamp 128, are adjusted vertically.

*Radiant Energy Baffle*

The radiant energy emitted by lamp 128 contains a high percentage of ultra violet radiation which is injurious to human eyes and human tissue. Means are therefore provided to prevent the radiant energy from falling on the eyes or skin of the user of the recorder.

These means comprise an access door baffle 200 formed by a vertical wall secured to top 3 between lamp 128 and access door 15.

This baffle also includes the lamp housing composed of a rear wall 201 having an opening in it through which a beam of radiant energy escapes from lamp 128 through first lens 134. This lamp housing also has a right vertical diagonal wall 202 and a left vertical diagonal wall 203 which join at the front of the lamp housing. A top 204 and a bottom 205 complete the lamp housing which substantially completely surrounds lamp 128 and prevents the escape of radiant energy therefrom in any but the desired direction.

*Optical Arrangement*

This recorder includes an optical arrangement which provides means whereby radiant energy is transmitted from the source onto the surface of the film or recording medium F. This optical arrangement comprises a number of lenses and mirrors disclosed in FIGS. 3, 12, 13, 14, and 17.

This optical arrangement is important in the production of the record at high speeds. This high speed is possible, in part, because a large percentage of the energy produced at the source is transmitted in a high concentration to a small spot of intense radiation on the surface of the film F.

This optical arrangement also makes it possible to keep the galvanometer mirror to a small size, thus keeping the galvanometer mass and inertia as small as possible. This contributes to the high frequency response of the galvanometer and permits higher writing speeds than would otherwise be possible.

Figures 13, 17:
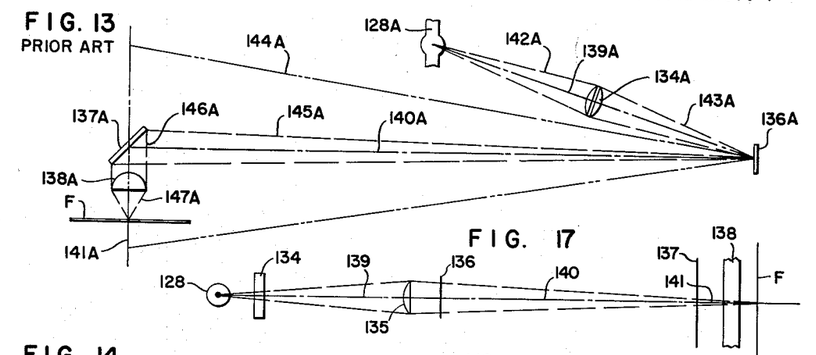
FIGS. 13, 14 and 17 are diagrams of optical arrangements.
Figures 14, 16:
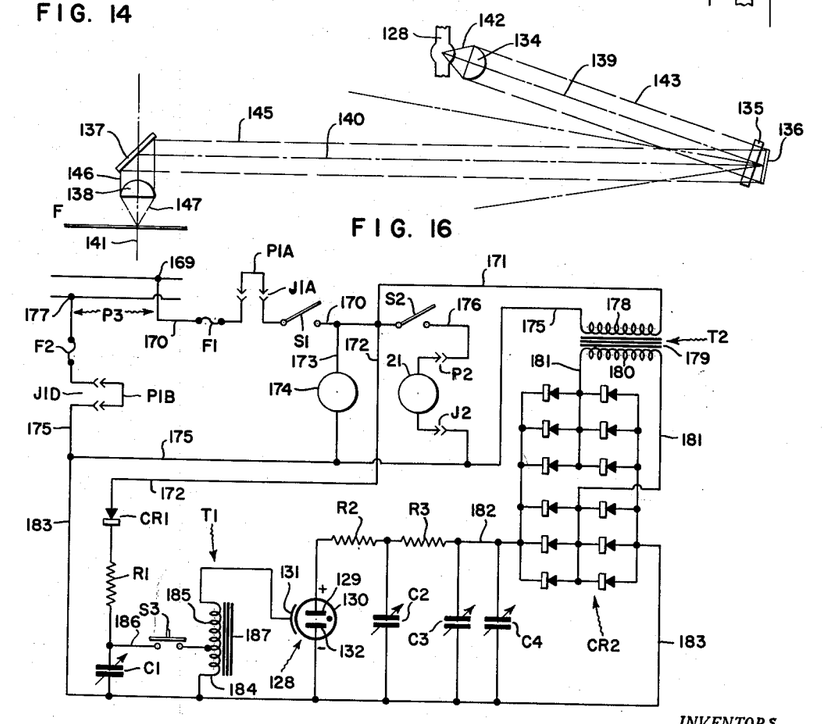
FIGS. 15 and 16 are diagrams of electric circuits.

In order to explain the optical system it is necessary to show its operation in two planes, the horizontal and vertical. The vertical plane is shown in FIGS. 13 and 14 and the horizontal plane is normal to the paper as is seen in FIG. 17. FIG. 13 shows an optical arrangement as known to the prior art over which the present invention is an improvement. FIG. 13 discloses an optical arrangement which is to be found in a book entitled "Sound Recording," by Frayne and Wolf (Wiley, 1950), page 290.

The radiant energy emitted by the source 128A passes in a cone of beams indicated by the lines 142A and having an axis along line 139A to a spherical lens 134A. Lens 134A directs the beams of radiant energy as indicated by the lines 143A and concentrates these beams on the surface of galvanometer mirror 136A. Galvanometer mirror 136A reflects the beam of radiant energy in a cone having its axis indicated by the line 140A and its perimeter indicated by the lines 144A. A certain percentage of this radiant energy, comprising a cone whose edges are indicated by the lines 145A, falls on the second mirror 137A. Second mirror 137A reflects these beams of radiant energy onto a second lens 138A along an axis indicated by the line 141A and having edges indicated by the lines 146A. Second lens 138A concentrates the beam of radiant energy into a small spot of high intensity on the surface of the film or recording medium F. This is indicated by the lines 147A.

FIGS. 14 and 17 disclose the optical arrangement of this invention. Radiant energy emitted by the source 128 passes along the axis indicated by the line 139 and in a wedge whose edges are indicated by the lines 142 to a first lens 134. Lens 134 is illustrated as a segmental cylindrical lens located about one-half inch from the source 128. The distance between the source 128 and lens 134 is as close as possible consistent with the size and shape of the lamp 128 itself and with reasonable lens design. Therefore, lens 134 collects as much radiant energy as possible and directs this radiant energy to the galvanometer lens 135 and the galvanometer mirror 136.

The galvanometer lens 135 is a true cylindrical lens having the axis of its cylindrical surface nearly parallel to axis of rotation of galvanometer mirror. Galvanometer lens 135 therefore concentrates as much as possible of the radiant energy in the horizontal plane onto the surface of galvanometer mirror 136. Galvanometer mirror 136 reflects this radiant energy along a line whose axis is indicated by the line 140 and whose edges are indicated by the lines 145. This beam of radiant energy is directed to second mirror 137 which reflects the beam of radiant energy to second lens 138 along a line whose axis is indicated by the line 141 and whose edges are indicated by the lines 146. Second lens 138 is illustrated as a segmental cylindrical lens and serves to concentrate as much as possible of the radiant energy in a small spot of high intensity on the surface of the film F. This lens 138 does this by concentrating the radiant energy into a wedge having its axis along the line 141 and its edges as indicated by the lines 147.

FIG. 14 shows that in the vertical plane the galvanometer lens 135 has no effect because its cylindrical axis is in the plane of the paper and nearly parallel to the axis of rotation of galvanometer mirror 136. It is purposely not parallel to the galvanometer mirror so that light reflected from the lens will not be directed along line 140 to form a ghost image on the recording paper.

In the horizontal plane, lenses 134 and 138 are of no effect because their cylindrical axes are in the horizontal plane. In this plane the galvanometer lens 135 serves to focus, or form an image of, the arc on the film or recording medium F—not on the galvanometer mirror.

Alternatively, the galvanometer lens 135 may be made spherical in shape. Theoretically, it is not correct to use a spherical lens as the galvanometer lens 135 but it works reasonably well in practice. The cylindrical lens 135 is slightly out of focus in one plane but it does not give off a "ghost" image, i.e., a reflection on the surface of the lens which shows up on the record.

Lenses 134, 135 and 138 may all be made of quartz overcoated with magnesium fluoride ($MgF_2$) of thickness one-fourth wavelength at 3600 angstrom units to protect the surfaces and to reduce reflection. Galvanometer mirror 136 is optically flat and is coated with aluminum and overcoated with $MgF_2$ of thickness of one-half wavelength at 3600 angstroms to reinforce reflections. The $MgF_2$ coating serves a primarily mechanical function to protect the surface. It is hard and protects the soft aluminum surface.

FIGS. 3, 10, and 11 show the way in which lamp 128 is adjusted vertically and the way in which first lens 134 is adjusted along axis 139 (FIGS. 14 and 17) toward and away from lamp 128. Cross piece 148 has horizontal ends through which holes pass. These holes encircle the tubes 123 and 123A. Cross piece 148 is flat with a sloping center section 149 on which is mounted an L-shaped member 150 having a slotted hole 151 through it. At its inner end member 150, adjacent to lamp 128 has a bent over area 152 which engages the flat surface of lens 134 and has a square hole forming an aperture for lens 134. On the upper surface of L-shaped member 150 is mounted a second L-shaped member 153 having an opening 154 through it and a pair of bent over ends 155 which engage the spherical surface of lens 134. Bent over ends 152 and 155 thus serve to clamp lens 134 between them but to leave a narrow, central slot through which radiant energy from lamp 128 can pass through lens 134 along axis 139. Screw 155 passes through openings 151 and 154 and thus secures L-shaped members 150 and 149 in selected, adjustable position on the centerpiece 149.

FIGS. 3 and 12 show how galvanometer lens 135 is mounted adjacent galvanometer mirror 136. The details of the galvanometer will be explained more fully hereinafter.

FIG. 3 shows how third mirror 137 is mounted in top 3 by means of third L-shaped member 156 which is fastened at its end to brackets projecting inwardly from a front of top 3.

FIG. 3 also shows how third lens 138 is mounted in top 3 by means of brackets 157 mounted in plates projecting inwardly from the front of top 3 and surrounding the ends of third lens 138.

*Galvanometers*

This recorder includes means for moving the film and/or moving the beam of radiant energy relative to each other in such a way that the location at which the beam strikes the film represents the instantaneous value or character of the phenomenon which modulates the beam. The beam produces a trace or image on the film. The modulation of the beam may be in respect to amplitude of deflection, intensity, width, frequency, or character.

The means specifically disclosed in this application are galvanometers which are duplicates so that but one need be described. These galvanometers are capable of use apart from the invention herein described. Similar galvanometers are shown and claimed in U.S. Patent No. 2,535,065, issued December 26 1950.

Figure 4:
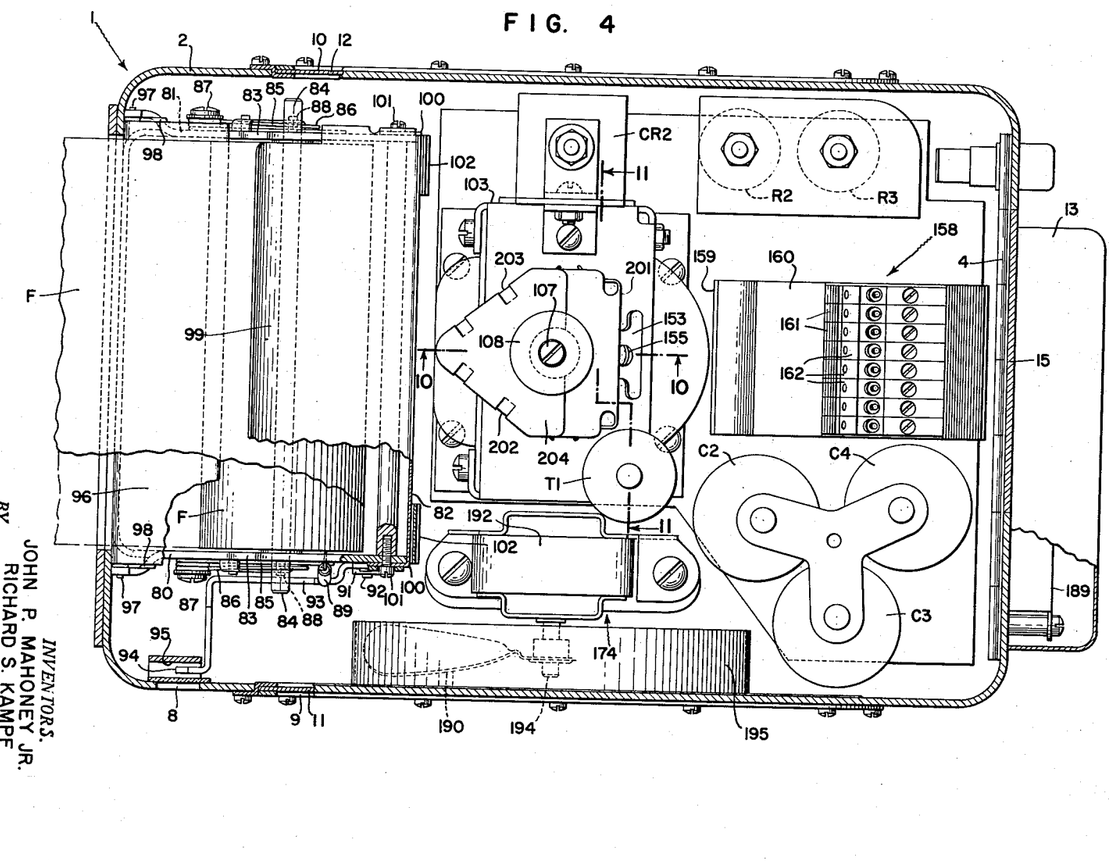
FIG. 4 is a top or plan view taken on the line 4—4 of FIG. 1 as viewed in the direction of the arrows.

FIGS. 3, 4 and 12 show that in this embodiment of the invention there are eight identical galvanometers 158 supported on the base 2. This is a convenient number for simultaneous study and comparison of that number of phenomena. Each of these galvanometers 158 consists essentially of a permanent magnet 159 having stationary pole pieces 160 with which cooperate rotatable pole pieces 161. On rotatable pole pieces 161 is supported a pencil 162 having a hollow interior in which are mounted supports 163 of which but one is shown in the drawing. Between supports 163 extends a support ribbon 164 comprising a filament of quartz or the like. On support ribbon 164 is located galvanometer mirror 136. Each galvanometer mirror 136 is so located that the beam of radiant energy from the light source 128 is directed by galvanometer lens 135 onto the galvanometer mirror 136.

Also mounted on support ribbon 164 is a galvanometer coil 165 which is located adjacent the inner end of the rotatable pole pieces 161 so as to be in the path of flux passing across the air gap between the pole pieces. Coil 165 is connected by suitable electric conductors (shown in FIG. 15) to an electric circuit actuated by one of the phenomena being observed and studied. Variations of this phenomenon cause a change in the current flowing through coil 165 and consequently cause the coil 165 to deflect the mirror 136 about the longitudinal axis of the ribbon support 164. This deflects a beam of radiant energy and causes it to traverse the film F as will be hereinafter described.

The circuit connections by means of which electricity is fed to one of the galvanometers 158 are shown in FIG. 15. This circuit comprises a pair of input terminals 166 to which are connected a pair of leads one of which contains a series resistor 167 and across which is connected a shunt resistor 168 and a galvanometer 158.

*Power Supply*

This power supply apparatus and the circuit connections therefor are disclosed in co-pending application of Dean D. Trautner, Serial No. 638,730, filed February 7, 1957, now Patent No. 2,923,858.

FIG. 16 is an electric circuit diagram showing the means whereby electric power is supplied to the recorder. These means comprise a plug P4 having a pair of input terminals 169 and 177. Terminal 169 is connected to a wire 170 containing a fuse F1 rated at five amperes, a plug P1 cooperating with the jack J1, a power switch S1, and a drive switch S2.

Wire 170 connects to four circuit branches. One branch of wire 171 is connected to one terminal of the primary coil 178 of a transformer T2. The other side of primary coil 178 is connected to wire 175. Wire 175 is connected through plug P2, jack J2, fuse F2, rated at five amperes, to input terminal 177. Input terminals 169 and 177 are adapted for connection to a commercial supply of electricity of 115 volts, 60 cycles, and can draw four amperes.

The second branch of wire 170 is wire 173 which connects fan motor 174 across the wires 173 and 175.

The third branch of wire 170 is drive switch S2 which is connected, on its off-going side, to wire 176 containing plug P3 and jack J3 cooperating with plug P3 to connect drive motor 21 between wires 176 and 175.

The fourth branch of wire 170 is wire 172 which connects selenium rectifier CR1 in series with resistor R1 having, for example, a value of 5,100 ohms, and a rating of two watts, and condenser C1 having, for example, a capacity of two microfarads (mfd.), and a working voltage of 200 volts, to wire 183.

Connected to the junction between resistor R1 and condenser C1 is a wire 186 containing a lamp switch S3 and connected at its opposite end to one input terminal of a trigger coil or auto transformer. This trigger coil has a primary winding consisting, for example, of 20 turns No. 25 American Wire Gauge wire. It has a secondary 185, consisting, for example, of 6,000 turns of No. 40 American Wire Gauge wire, and a core 186. The output end of secondary coil 185 is connected to starting contact 131 of the lamp or source of radiant energy 128. The other contact of primary coil 184 is connected through wire 183 to the cathode contact 132 of lamp 128.

Transformer T2 has a core 179 and a secondary coil 180 which is connected by means of conductors 181 to a rectifier CR2 comprising twelve germanium rectifiers connected together.

Rectifier CR2 has an output wire 182 connected thereto and containing a series resistor R3 which may have a value of 3 ohms and a rating of 120 watts, and a series resistor R2, which may have a resistance of 3 ohms and a rating of 120 watts. The opposite end of wire 182 is connected to the anode terminal 129 of the lamp 128.

The rectifier CR2 also has an output wire 183 connected thereto which connects, at its opposite end, to wire 175 and jack J2. Across wires 182 and 183 are connected three condensers C2, C3, and C4, each of which may have a capacity of 2,000 mfd. and a working voltage of 75 volts.

The operation of the power supply is as follows. The plug P4 is operated so that the input terminals 169 and 177 connect to the terminals of a commercial supply of 115 volts, 60 cycles, A.C. electricity. The power switch S1 is electrically interlocked with the drive switch S2 and with the lamp switch S3. Therefore, the power switch S1 must be closed so as to energize the fan motor 174 before the drive switch S2 can be closed to energize the drive motor 21 and before the lamp switch S3 can be closed to energize the lamp 128.

When it is desired to start up and ignite the lamp 128 the procedure is as follows. When the lamp is not on, i.e. when there is no current through lamp 128, the voltage applied to the anode terminal 129 and to the cathode terminal 132 is about 68 volts. The lamp switch S3 is then closed thus energizing the starting electrode 131 by a voltage causing a very short, high frequency, capacitor discharge into the low impedance coil 184 of trigger transformer T1. The frequency of this discharge is about 50 kilocycles per second. The voltage across the secondary coil 185 of trigger transformer T1 is about 15,000 volts. This high frequency discharge between starting electrode 131 and cathode electrode 132 ionizes the mercury vapor in lamp 128 and initiates a flow of current between the anode electrode 129 and the cathode electrode 132. When a flow of current is established between anode electrode 129 and cathode electrode 132, the voltage across lamp 128 drops to about 10 volts because the current flow of about 7 amperes reduces the voltage applied to the lamp because of the voltage drop across resistors R2 and R3. The lamp voltage tends to remain constant because lamp 128 is in the nature of a voltage regulator. Changes in the current and voltage occur in the practical operation of the apparatus, however, because of the heating of lamp 128, and the current decreases to about 5 amperes as the tube heats, maintaining a normal operating voltage across the tube 128 of about 20 volts.

FIG. 4 shows the physical embodiment and comparative size of a number of the elements of the power supply. The rectifier CR2 is located in the middle of the top of the figure. The resistors R2 and R3 are to the right thereof. The condensers C2, C3, and C4 are in the lower right hand corner of the figure. The trigger coil T1 is immediately to the left of the condenser C2.

*Cooling Means*

FIGS. 3 and 4 show means for dissipating the heat that is generated by the source of radiant energy 128 and by the electric drive motor 21 and by the power supply. This means is provided by an electric motor 174 which drives a fan 190 which draws in air through a large opening 9 in the side of the case 1.

Motor 174 comprises a coil of wire 191 mounted on a magnetic pole piece 192. In a gap in the pole piece 192 is located a rotor 193 having a shaft 194 connected thereto. Fan 190 is mounted on shaft 194 and is located in a cylindrical tunnel 195 communicating at one end to the interior of the casing 1 and at the opposite end with an opening 9 passing through the outer wall of the case. This opening 9 is partially closed by a screen or grid 11.

Attached to the bottom of case 2 by means of screw 199 is a U-shaped support 196 having holes in the ends thereof. Screws 197 pass through these holes and attach pole piece 192 to support 196 by means of rings 198 of flexible material through which the screws 197 pass.

*Recording Medium and Process of Sensitizing It*

The recording medium or film used in this apparatus and the process of sensitizing the film are explained more fully in the aforementioned co-pending application of R. A. LeMassena and R. S. Kampf.

In the preferred mode, the pre-exposure step is accomplished by exposing the recording medium uniformly to incandescent or fluorescent radiation including wavelengths in the band from 350 to 4000 millimicrons (peaking at about 1000 millimicrons) for a time sufficient properly to condition the recording medium as required to prevent reversal during the post-exposure step and to obtain the desired writing speed, resolution and contrast between trace or image and background. As described more fully hereinafter, we have discovered that a relationship exists between the intensity and spectral composition of the radiation and the time of pre-exposure and the contrast and permissible writing speed. Thus, with incandescent radiation, when the pre-exposure time is relatively long, for example, of the order of several hours, the permissible writing speed is highest and the best contrast is obtained. With shorter pre-exposure times of about one hour, the permissible writing speed is reduced with but a slight reduction in contrast. Pre-exposure with fluorescent radiation permits a substantial reduction in the pre-exposure time. The resulting permissible writing speeds and contrast, however, have been found to be lower than with incandescent radiation.

In the post-exposure step, referred to as latensification, the source of radiation employed may be the same as that used in making the exposure and produces radiation over the wave-length band from 200–600 millimicrons. Such a source is used for latensification when it is desired to accomplish this step in the process in the shortest time. Alternatively, the operation may be accomplished at a somewhat slower speed by a radiation source such as a fluorescent lamp which produces radiation over the wavelength band from 350 to 750 millimicrons. In this post-exposure step, it has been found that the recording medium exhibits a response over the band of wavelengths from 400 to 460 millimicrons.

*Summary*

The apparatus of this invention has the desirable advantages of producing a record in the form of a trace or image which is immediately visible within less than one tenth of a second after it has been made. This record will not fade upon subsequent illumination and may be made suitable for relatively permanent storage by subsequent chemical processing although this is not necessary normally. This record may be made at high speed because the beam of radiant energy is substantially without inertia, the parts which deflect this beam of radiant energy are small and have but little inertia, and the intensity of radiant energy is so high as to produce the record substantially instantaneously.

What is claimed is:

1. In an oscillograph for recording the time-variations of a phenomenon under observation by means of a trace on a recording medium, a high-pressure mercury-vapor lamp adapted to emit radiant energy having a large proportion of ultra violet frequencies, a first cylindrical collector lens located adjacent said lamp and adapted to receive radiant energy therefrom and to collimate said radiant energy into a beam, a galvanometer connected in an electric circuit so as to respond to the time-variations of a phenomenon under observation, a galvanometer mirror forming part of said galvanometer and adapted to be oscillated thereby, a cylindrical galvanometer lens of quartz located in said beam and adapted to transmit said radiant energy to said galvanometer mirror and to transmit radiant energy from said galvanometer mirror, a flat mirror adapted to receive said beam of radiant energy from said galvanometer mirror and from said spherical galvanometer lens, a cylindrical compensating lens adapted to receive said beam of radiant energy from said flat mirror and to concentrate said beam of radiant energy on said recording medium in a spot of high intensity, and means for moving said recording medium relative to said spot of high intensity so that said spot forms a trace on said recording medium.

2. In an oscillograph according to claim 1 in which at least one of said lenses is quartz and is overcoated with magnesium fluoride of a thickness of one quarter of a wavelength at 360 millimicrons to reduce reflection.

3. An oscillograph according to claim 1 in which said galvanometer mirror is optically flat and is coated with aluminum and overcoated with magnesium fluoride of thickness of one half wavelength at 360 millimicrons to enhance reflection.

4. In an oscillograph for recording the time-variations of a plurality of phenomena under observation by means of a plurality of traces on a recording medium, a segmental cylindrical collector lens having a flat face located close to a source of radiant energy and adapted to receive radiant energy therefrom and to collimate said radiant energy into a beam, a plurality of galvanometer mirrors each adapted to be oscillated by a separate galvanometer in response to the variations of one of the phenomena under observation and located in the path of said beam so as to deflect a portion of said beam upon oscillation of said mirror by one of said galvanometers, a plurality of cylindrical galvanometer lenses located in the path of said beam and each having the axis of its cylindrical surface nearly parallel to the axis of oscillation of one of said galvanometer mirrors and each adapted to transmit said radiant energy to one of said galvanometer mirrors and to transmit radiant energy reflected from said galvanometer mirror, a flat mirror adapted to receive each of said beams of radiant energy from each of said galvanometer mirrors, and a single segmental cylindrical concentrating lens adapted to receive said beams of radiant energy from said flat mirror and to concentrate said beams of radiant energy into spots of high intensity on said recording medium and having a flat face adjacent said recording medium.

5. In an oscillograph for recording the time-variations of a plurality of phenomena under observation by means of a plurality of traces on a recording medium, a source of radiant energy, a segmental cylindrical collector lens having a flat face located close to said source of radiant energy and placed to receive radiant energy therefrom and to collimate said radiant energy into a beam, a plurality of flat galvanometer mirrors each adapted to be oscillated by a separate galvanometer in response to the variations of one of the phenomena under observation and located in the path of said beam so as to deflect a portion of said beam upon oscillation of said mirror by one of said galvanometers, a plurality of cylindrical galvanometer lenses located in the path of said beam and each having the axis of its cylindrical surface at an angle to the axis of the cylindrical surface of said collector lens and nearly parallel to the axis of oscillation of one of said galvanometer mirrors and each placed to transmit said radiant energy reflected from said galvanometer mirror and to focus an image of said source on said recording medium, a flat mirror placed to receive each of said beams of radiant energy from each of said galvanometer mirrors, and a single segmental cylindrical concentrating lens having the axis of its cylindrical surface substantially parallel to the axis of the cylindrical surface of said collector lens and at an angle to the axis of the cylindrical surfaces of said galvanometer lenses and placed to receive said beams of radiant energy from said flat mirror and to concentrate said beams of radiant energy into spots of high intensity on said recording medium and having a flat face adjacent said recording medium.

6. In an oscillograph for recording the time-variations of a plurality of phenomena under observation by means of a plurality of traces on a recording medium, a source of radiant energy, a segmental cylindrical collector lens having a flat face located close to said source of radiant energy and placed to receive radiant energy therefrom and to collimate said radiant energy into a beam, a plurality of flat galvanometer mirrors each adapted to be oscillated by a separate galvanometer in response to the variations of one of the phenomena under observation and located in the path of said beam so as to deflect a portion of said beam upon oscillation of said mirror by one of said galvanometers, a plurality of cylindrical galvanometer lenses located in the path of said beam and each having the axis of its cylindrical surface at an angle to the axis of the cylindrical surface of said collector lens and nearly parallel to the axis of oscillation of one of said galvanometer mirrors and each placed to transmit said radiant energy to one of said galvanometer mirrors and to transmit radiant energy reflected from said galvanometer and to focus an image of said source on said recording medium, and means to receive each of said beams of radiant energy from each of said galvanometer mirrors and to concentrate said beams of radiant energy into spots of high intensity on said recording medium.

7. In an oscillograph for recording the time-variations of a plurality of phenomena under observation by means of a plurality of traces on a recording medium, a source of radiant energy, means located close to said source of radiant energy and receiving radiant energy from said source of radiant energy and collimating said radiant energy into a beam, a plurality of flat galvanometer mirrors each adapted to be oscillated by a separate galvanometer in response to the variations of one of the phenomena under observation and located in the path of said beam so as to deflect a portion of said beam upon oscillation of said mirror by one of said galvanometers, a plurality of cylindrical galvanometer lenses located in the path of said beam and each having the axis of its cylindrical surface nearly parallel to the axis of oscillation of one of said galvanometer mirrors and each placed to transmit said radiant energy to one of said galvanometer mirrors and to transmit radiant energy reflected from said galvanometer and to focus an image of said source on said recording medium, and means receiving each of said beams of radiant energy from each of said galvanometer mirrors and concentrating said beams of radiant energy into spots of high intensity on said recording medium.

References Cited in the file of this patent

UNITED STATES PATENTS

| | | |
|---|---|---|
| 1,604,194 | Pieper et al. | Oct. 26, 1926 |
| 2,259,395 | Sachtleben | Oct. 14, 1941 |
| 2,282,677 | Rayton | May 12, 1942 |
| 2,366,194 | Kaiser | Jan. 2, 1945 |
| 2,436,148 | Maurer | Feb. 17, 1948 |
| 2,580,427 | Heiland | Jan. 1, 1952 |
| 2,613,127 | Geiser | Oct. 7, 1952 |
| 2,615,778 | Butz | Oct. 28, 1952 |
| 2,646,337 | Gorham | July 21, 1953 |
| 2,647,441 | Boydston et al. | Aug. 4, 1953 |
| 2,719,293 | Hornbruch et al. | Sept. 27, 1955 |
| 2,769,683 | Skelton | Nov. 6, 1956 |
| 2,796,317 | Valenti et al. | June 18, 1957 |

FOREIGN PATENTS

| | | |
|---|---|---|
| 377,158 | Great Britain | Jan. 12, 1931 |
| 839,449 | France | Jan. 4, 1939 |
| 281,476 | Switzerland | June 16, 1952 |